(12) United States Patent
Hasegawa

(10) Patent No.: US 6,860,354 B2
(45) Date of Patent: Mar. 1, 2005

(54) RUNNING POWER TRANSMISSION MECHANISM FOR A VEHICLE

(75) Inventor: Toshiyuki Hasegawa, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 86 days.

(21) Appl. No.: 10/277,077

(22) Filed: Oct. 21, 2002

(65) Prior Publication Data

US 2003/0079928 A1 May 1, 2003

(30) Foreign Application Priority Data

Oct. 30, 2001 (JP) ........................................ 2001-332972

(51) Int. Cl.[7] ............................................ B60K 17/356
(52) U.S. Cl. ..................................... 180/242; 180/305
(58) Field of Search ................................ 180/242, 248, 180/305, 307, 6.2

(56) References Cited

U.S. PATENT DOCUMENTS

| | | | | |
|---|---|---|---|---|
| 4,886,142 A | * | 12/1989 | Yamaoka et al. | ........... 180/242 |
| 5,997,425 A | * | 12/1999 | Coutant et al. | ................ 475/18 |
| 6,126,564 A | * | 10/2000 | Irikura et al. | .................. 475/24 |
| 6,189,641 B1 | * | 2/2001 | Azuma | ........................ 180/242 |
| 6,196,348 B1 | * | 3/2001 | Yano et al. | .................. 180/242 |
| 6,336,513 B1 | * | 1/2002 | Hasegawa et al. | ........... 180/6.2 |
| 6,601,474 B2 | * | 8/2003 | Ishimaru et al. | ....... 74/665 GA |

* cited by examiner

Primary Examiner—Anne Marie Boehler
(74) Attorney, Agent, or Firm—Wood, Phillips, Katz, Clark & Mortimer

(57) ABSTRACT

A running power transmission mechanism includes a main-transmission device and a steering-wheel speed change device. The steering-wheel speed change device in turn includes a non-stepwise speed change unit and a planetary differential unit. Drive power from the main-transmission device is inputted into a first element of the planetary differential unit, and output of the non-stepwise speed change unit is inputted into a second element of the planetary differential unit, while steering-wheel drive power is taken off from a third element of the planetary differential unit. Also, the speed of the output of the non-stepwise speed change unit is changed according to the steering angle of the steering wheels.

8 Claims, 11 Drawing Sheets

RUNNING POWER TRANSMISSION MECHANISM FOR A VEHICLE

BACKGROUND OF THE INVENTION

1. Field of the Invention

The present invention relates to a running power transmission mechanism for a vehicle, which transmits drive power from a driving source to steering and non-steering wheels, which are respectively disposed closer to first and second sides of the vehicle in a fore and aft direction thereof.

2. Related Art

In respect to the vehicle with the steering and non-steering wheels respectively disposed closer to the first and second sides of the vehicle in the fore and aft direction thereof, it is known that, when turning the vehicle, the steering wheels are rotated at a higher speed than the non-steering wheels so as to shorten the turning radius of the vehicle and prevent such as slippage of the steering wheels. This arrangement poses problems as mentioned below.

That is, there has been proposed a transmission mechanism, in which a steering-wheel driving mechanism in the form of a geared transmission unit is installed in a steering-wheel driving train so as to allow the speed of the geared transmission unit to be changed in accordance with the operation of an operation lever. In this transmission mechanism with the geared transmission unit, the speed at which the steering wheels are driven (steering-wheel drive speed) is stepwisely changed, and therefore there causes a speed differential in changing the steering-wheel drive speed, resulting in deteriorated ride quality and likelihood of damaging a running surface such as lawn.

As another form of the steering-wheel driving mechanism, there has been also proposed an HST, which has a hydraulic pump and a hydraulic motor in the steering-wheel driving train so as to be capable of non-stepwisely changing the speed of the output of the hydraulic motor by the control of the slanting angle of a swash plate of the hydraulic pump according to the steering angle of the steering wheels.

Although the transmission mechanism with the HST can non-stepwisely change the steering-wheel drive speed and therefore does not cause the problems as mentioned above, it cause a different problem due to a specific construction of the transmission mechanism with the HST, which requires the entire power for driving the steering wheels to be transmitted through the HST to the steering wheels, and hence only the HST to change the steering-wheel driving speed. As a result, the HST must have a bigger size for achieving this function, which may invite high production cost and increased installation space.

The present invention has been conceived to solve the above problems. It is an object of the present invention to provide a running power transmission mechanism that is capable of stepwisely changing the speed of drive power transmitted to the steering wheels, as well as achieving cost reduction and decreased installation space.

SUMMARY OF THE INVENTION

According to the present invention, there is provided a running power transmission mechanism that includes a main-transmission device and a steering-wheel speed change device. The steering-wheel speed change device in turn includes a non-stepwise speed change unit and a planetary differential unit. Drive power from the main-transmission device is inputted into a first element of the planetary differential unit, and output of the non-stepwise speed change unit is inputted into a second element of the planetary differential unit, while steering-wheel drive power is taken off from a third element of the planetary differential unit. Also, the speed of the output of the non-stepwise speed change unit is changed according to the steering angle of the steering wheels. As a result, it is possible to downsize the non-stepwise speed change unit and hence provide an improved deign flexibility in designing the vehicle, while effectively preventing slippage of the steering wheels on a running surface when turning the vehicle, and any other associated undesirable effect.

The non-stepwise speed change unit may include an input shaft for receiving a part of power from the steering-wheel drive output shaft. In this arrangement, the first element of the planetary differential unit is designed to receive the residual part of the power from the steering-wheel drive output shaft. Also, a clutch member may be provided in a transmission train from the main-transmission device to the non-stepwise speed change unit. With this clutch member, it is possible to produce a 2-wheel drive operation with only the non-steering wheels driven in an economical manner.

Also, it is possible to employ the arrangement where the non-stepwise speed change unit is constituted by an HST, and a bypass valve is provided in a hydraulic passage for fluid connection between a hydraulic pump body and a hydraulic motor body of the HST, instead of or in addition to the clutch member. This arrangement also produces the 2-wheel drive operation with only the steered non-steering wheels driven in an economical manner.

Also, it is possible to employ the arrangement where the non-stepwise speed change unit is constituted by an HST, and a bypass valve is provided in a hydraulic passage for fluid connection between a hydraulic pump body and a hydraulic motor body of the HST, instead of or in addition to the clutch member. This arrangement also produces the 2-wheel drive operation with only the steered wheels driven in an economical manner.

Where the output adjusting member is operated so that an average peripheral speed of the steering wheels is increased and a rate of increase in said average peripheral speed of the steering wheels relative to a displacement of the steering angle of the steering wheels is accelerated, as the steering angle of the steering wheels is enlarge, the turning radius of the vehicle can be decreased when it is sharply turned. As a result, vehicle controllability matching to a driver's intention can be produced.

The steering-wheel speed change device may be detachably attached to the main-transmission device. This achieves ease of modification in specification to a 2-wheel drive specification, or a normal 4-wheel drive specification which does not require a mechanism for increasing the speed of the steering wheels.

Where constant drive output from the driving source is inputted into the non-stepwise speed change unit, a behavior of the non-stepwise speed change unit can be stabilized. In this arrangement, the output adjusting member is controlled based upon the steering angle and average peripheral speed of the steering wheels, and the rotational direction and average peripheral speed of the non-steering wheels so that the steering wheels and the non-steering wheels are rotated in synchronization with each other when the steering wheels are in a straight travelling state, and the speed of the steering wheels is increased as the steering angle of the steering wheels is enlarged when the steering wheels are in a turning state.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

First Embodiment

Figure 1:
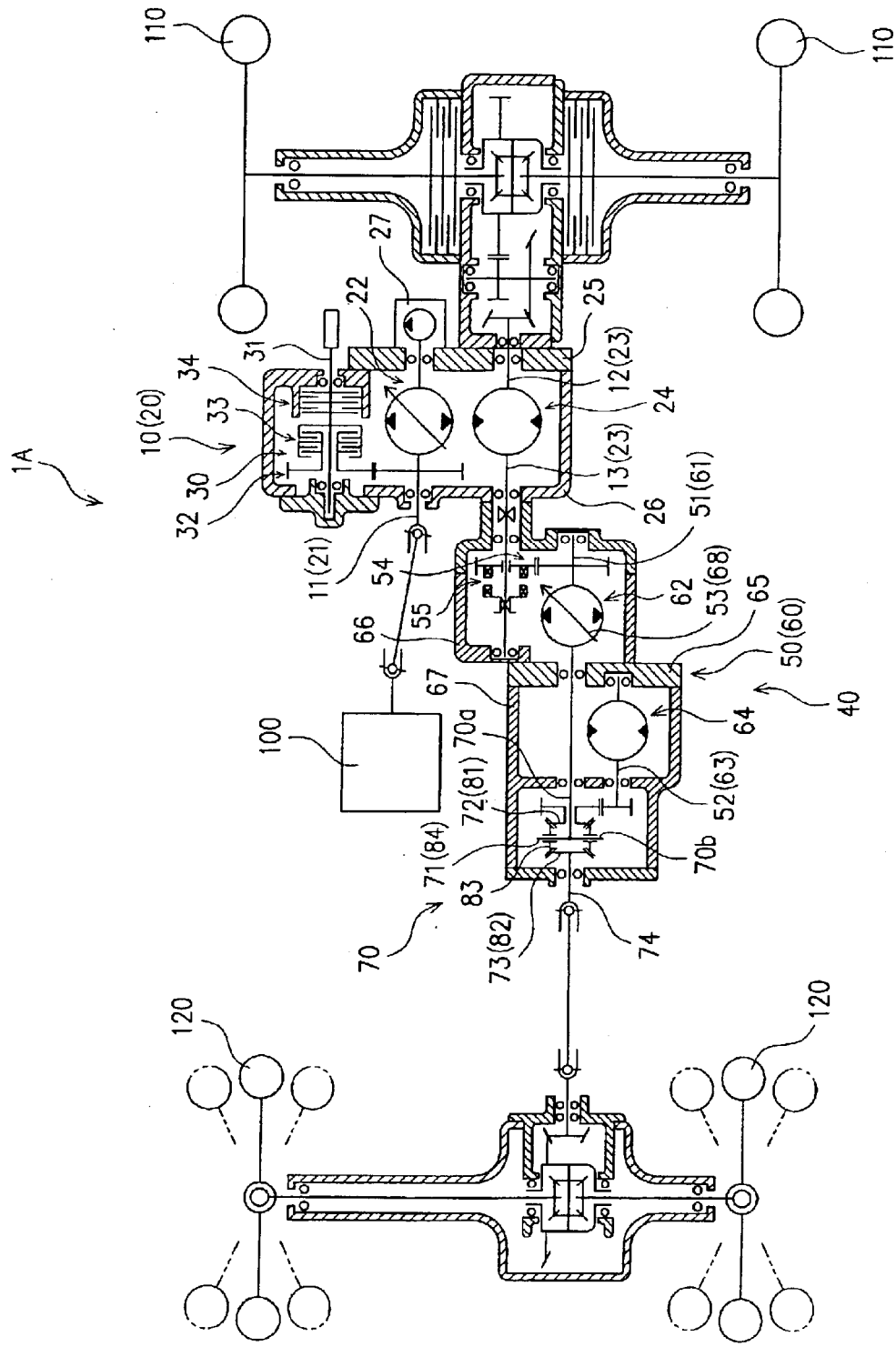
FIG. 1 is a model view illustrating power transmission of a vehicle to which a first embodiment of the running power transmission mechanism according to the present invention has been applied.

The description will be made for a first embodiment of the present invention with reference to the accompanied drawings. FIG. 1 is a model view illustrating power transmission of a vehicle to which running power transmission mechanism 1A of this embodiment according to the present invention has been applied.

The running power transmission mechanism 1A of this embodiment is so designed to divide drive power from driving source 100 into two transmission lines respectively extending to steered wheels 110 and steering wheels 120, which are respectively disposed closer to first and second sides of the vehicle in a fore and aft direction of the vehicle. In this embodiment, rear and front wheels are respectively designated as the steering and steered wheels.

The running power transmission mechanism 1A includes main-transmission device 10 having an output shaft for outputting drive power to the steering wheels 120, which drive power being synchronized with drive power outputted to the non-steering wheels 110, and steering-wheel speed change device 40 disposed on the downstream side of the main-transmission device 10 in a power transmission direction. As used throughout the description, the directional term "upstream" and "downstream" are relative to the power transmission direction. Also, "first side" and "second side" are relative to the fore and aft direction of the vehicle.

The main-transmission device 10 is so designed to be capable of outputting synchronized drive power to the non-steering wheels 110 and the steering wheels 120, respectively. For example, the main-transmission device 10 may include main-input shaft 11 operatively connected with the driving source 100, first main-output shaft 12 for driving the non-steering wheels that outputs drive power, which has been inputted through the main-input shaft 11, to the non-steering wheels 110, and second main-output shaft 13 for driving the steering wheels that outputs drive power, which is synchronized with the drive power outputted through the first main-output shaft 12, to the steering wheels 120. In this arrangement, the second main-output shaft 13 constitutes the output shaft for driving the steering wheels.

In this embodiment, hydrostatic transmission 20 (hereinafter referred to as a main-HST) is used as the main-transmission device 10.

More specifically, the main-HST 20 includes main-pump shaft 21 serving as the main-input shaft 11, main-hydraulic pump body 22 driven by the main-pump shaft 21, main-motor shaft 23 serving as the first and second main-output shafts 12, 13, main-hydraulic motor body 24 that is fluidly connected with the main-hydraulic pump body 22 so as to transmit drive power with its speed non-stepwisely changed in cooperation with the main-hydraulic pump body 22 to the main-motor shaft 23, main-center section 25 that supports the main-hydraulic pump body 22 and the main-hydraulic motor body 24 and forms therein a hydraulic passage for fluid connection therebetween, and main housing 26 connected with the main-center section 25 so as to enclose the main-hydraulic pump body 22 and the main-hydraulic motor body 24.

The main-pump shaft 21 has an upstream end (a rear end in this embodiment) and a downstream end (a forward end in this embodiment), which extend to the outside respectively through the main housing 26 and the main-center section 25.

The upstream end of the main-pump shaft 21 is coupled with the driving source 100 via a universal joint and a transmission shaft, and the downstream end thereof is provided with charge pump 27.

The main-motor shaft 23 has a first end (a forward end in this embodiment) and a second end (a rear end in this embodiment), which extend to the outside respectively through the main-center section 25 and the main housing 26.

In this embodiment, the first end of the main-motor shaft 23 serves as the first main-output shaft 12 that outputs drive power for driving the non-steering wheels (non-steering-wheel drive power), and the second end thereof serves as the second main-output shaft 13 that outputs drive power for driving the steering wheels (steering-wheel drive power), which is synchronized with the drive power for driving the non-steering wheels.

Preferably, the main-HST 20 is provided with PTO unit 30 for taking off drive power for an outside device.

The PTO unit 30 may include PTO shaft 31 supported on the main housing 26 so as to have at least one end extending to the outside, power transmission member 32 for coupling between the main-pump shaft 21 and the PTO shaft 31, clutch member 33 capable of engaging and disengaging for selectively transmitting drive power from the main-pump shaft 21 to the PTO shaft 31, and brake member 34 for applying braking force to the PTO shaft 31 when shutting off the transmission of drive power by the clutch member 33.

In this embodiment, as illustrated in FIG. 1, the main-hydraulic pump body 22 and the main-hydraulic motor body 24 are respectively designated as being of a variable displacement type and a fixed displacement type. This may be varied as long as at least one of them is of the variable displacement type.

Although the main-HST 20 is employed as the main-transmission device 10 in this embodiment, the present invention is not necessarily limited to this embodiment. Rather, the main-transmission device 10 may take various forms such as an electric motor driven by a battery, belt-type speed-change device or geared stepwise speed change device, provided that it receives drive power from the driving source 100 and outputs synchronized drive power to the non-steering wheels 110 and the steering wheels 120.

The steering-wheel speed change device 40 includes non-stepwise speed change unit 50 that has input shaft 51, output shaft 52 and output adjusting member 53 and is so designed to receive a part of drive power from the second main-output shaft 13 by the input shaft 51 and output through the output shaft 52 the part of drive power with its speed non-stepwisely changed based upon a motion of the output adjusting member 53, which is operated in association with the steering wheels 120 so as to vary its adjustment amount according to the steering angle of the steering wheels 120, and planetary differential unit 70 that has first to third elements 71, 72, 73 and is so designed that the first element 71 and the second element 72 respectively receive the residual part of the drive power from the second main-output shaft 13 and drive power from the output shaft 52 of the non-stepwise speed change unit 50, and the third element 73 outputs drive power to the steering wheels 120.

In this embodiment, an HST (hereinafter referred to as a sub-HST) 60 is employed as the non-stepwise speed change unit 50 in the same manner as the main-transmission device 10. This non-stepwise speed change unit 50 may take various forms such as an electric motor driven by a battery, a CVT (Continuously Variable Transmission) represented by those of a belt type and a ring cone type, and the like, provided that it can output power with its speed non-stepwisely changed to the planetary differential unit 70.

The sub-HST 60 includes sub-pump shaft 61 that is coupled with the second main-output shaft 13 so as to serve as the input shaft 51, sub-hydraulic pump body 62 that is driven by the sub-pump shaft 61, sub-motor shaft 63 that serves as the output shaft 52, sub-hydraulic motor body 64 that is fluidly connected with the sub-hydraulic pump body 62 so as to transmit drive power with its speed non-stepwisely changed in cooperation with the sub-hydraulic pump body 62 to the sub-motor shaft 63, sub-center section 65 that has a first side facing the first side of the vehicle and a second side facing the second side of the vehicle, on which the sub-hydraulic pump body 62 and the sub-hydraulic motor body 64 are respectively supported, and forms a hydraulic passage for fluid connection therebetween, sub-pump housing 66 connected with a first side of the sub-center section 65 facing the first side of the vehicle so as to enclose the sub-hydraulic pump body 62, and sub-motor housing 67 that is connected with a second side of the sub-center section 65 facing the second side of the vehicle so as to enclose the sub-hydraulic motor body 64.

In this embodiment, the sub-hydraulic pump body 62 is designated as being of the variable displacement type that includes movable swash plate 68, and the sub-hydraulic motor body 64 is designated as being of the fixed displacement type. In this arrangement, the movable swash plate 68 serves as the output adjusting member 53 of the non-stepwise speed change unit 50.

The sub-pump shaft 61 has an upstream end (a front end in this embodiment) and a downstream end (a rear end in this embodiment), which respectively extend through the sub-hydraulic pump body 62.

The upstream end of the sub-pump shaft 61 is operatively connected with the second main-output shaft 13. That is, the second main-output shaft 13 (the second end of the main-motor shaft 23 in this embodiment) extends into the sub-pump housing 66, and is coupled with the sub-pump shaft 61 via its upstream end with power transmission mechanism 54 of any suitable type.

On the other hand, the downstream end of the sub-pump shaft 61 is operatively connected with the first element of the planetary differential unit 70, as described in detail hereinbelow.

Preferably, the power transmission mechanism 54 is provided with clutch device 55 between the second main-output shaft 13 and the upstream end of the sub-pump shaft 61. By providing this clutch device 55, it is possible to stop inputting any drive power into the steering-wheel speed change device 40 during the steering wheels 120 are not driven or the vehicle is in a 2-wheel drive operation with only the non-steering wheels 110 driven. This can reduce power loss due to the steering-wheel speed change device 40. As a result, horsepower loss in the running power transmission path from the driving source to the driving wheels can be reduced.

The sub-motor shaft 63 has a downstream end (a rear end in this embodiment), which extends downstream through the sub-hydraulic motor body 64.

The planetary differential unit 70 is disposed on the downstream side of the sub-hydraulic motor body 64. This planetary differential unit 70 includes first and second side bevel gears 81, 82 that lie on first rotation axis 70a and respectively serve as first and second sun gears, planetary bevel gear 83 serving as planetary gears, which are respectively meshed with the first and second side bevel gears 81, 82 so as to move around the first rotation axis 70a and rotate on second rotation axis 70b orthogonal to the first rotation axis 70a, and pinion shaft 84 serving as a planetary carrier, which supports the planetary bevel gear 83 while enabling it to be rotatable around the second rotation axis 70b, and which is disposed so as to rotate around the first rotation axis 70a along with the orbital motion of the planetary bevel gear 83.

The pinion shaft 84 is operatively connected with the downstream end of the sub-pump shaft 61. Also, the first side bevel gear 81 is operatively connected with the downstream end of the sub-motor shaft 63. The second side bevel gear 82 is operatively connected with steering-wheel drive shaft 74 for outputting power to the steering wheels 120. That is, in the planetary differential unit 70, the pinion shaft 84, the first side bevel gear 81 and the second side bevel gear 82 respectively serve as the first, second and third elements 71, 72, 73.

In this embodiment, the planetary differential unit 70 is accommodated within the sub-motor housing 67. Instead of this, it is a matter of course to provide a housing exclusively used for the planetary differential unit 70.

Thus, in the running power transmission mechanism 1A according to this embodiment, a part of steering-wheel drive power outputted from the main-transmission device 10 to the steering wheels 120 with its speed changed at the non-stepwise speed change unit 50 is inputted into the second element 72 of the planetary differential unit 70 as a variable input, while the remaining part of the steering-wheel drive power is directly inputted into the first element 71 of the planetary differential unit 70 as a fixed input rather than inputting into the non-stepwise speed change unit 50, and drive power is outputted to the steering wheels 120 through the third element 73 of the planetary differential unit 70.

The running power transmission mechanism 1A is also so designed to be capable of changing the output of the non-stepwise speed change unit 50 according to the steering angle of the steering wheels 120, which output is inputted into the second element 72. More specifically, the running power transmission mechanism 1A includes operation mechanism 200 for the non-stepwise speed change unit 50 (non-stepwise-speed-change-unit operation mechanism 200), which actuates the output adjusting member 53 of the non-stepwise speed change unit 50 according to the steering angle of the steering wheels 120.

Now, the description will be made for the non-stepwise-speed-change-unit operation mechanism 200.

When the vehicle is turned by turning the steering wheels 120, the turning radius of the steering wheels 120 is larger than that of the non-steering wheels 110. Accordingly, when the vehicle is turned or when the steering wheels 120 are turned in the 4-wheel drive operation with both the steering and non-steering wheels 120, 110 driven, the steering wheels 120 must be rotated at a higher speed than the non-steering wheels 110. Otherwise, the steering wheels 120 slip, hence damaging a running surface such as lawn, as well as causing the vehicle to have a larger turning radius.

Figure 2:
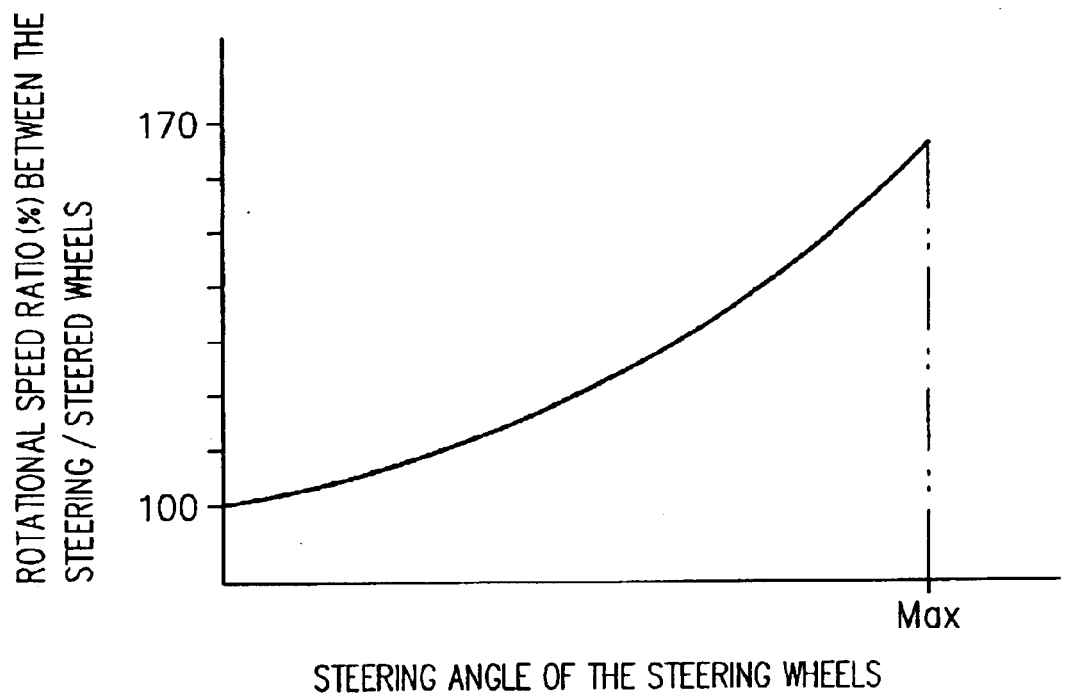
FIG. 2 is a graph showing variation in rotational speed ratio between the steering and non-steering wheels according to a displacement of the steering angle of the steering wheels.

It is to be noted that only the increase in rotational drive speed of the steering wheels 120 simply in proportion to the steering angle of the steering wheels 120 may not produce a sufficient effect. That is, in comparison with the case where the driver turns the steering wheels 120 with a large steering angle and the case where the driver turns the same with a small steering angle, it is understandable that the former involves a sharp turning as compared with the latter. Therefore, as illustrated in FIG. 2, as the steering angle of the steering wheels 120 is enlarged, the rate of increase in rotational drive speed of the steering wheels relative to the steering angle of the steering wheels must be accelerated.

Figure 3:
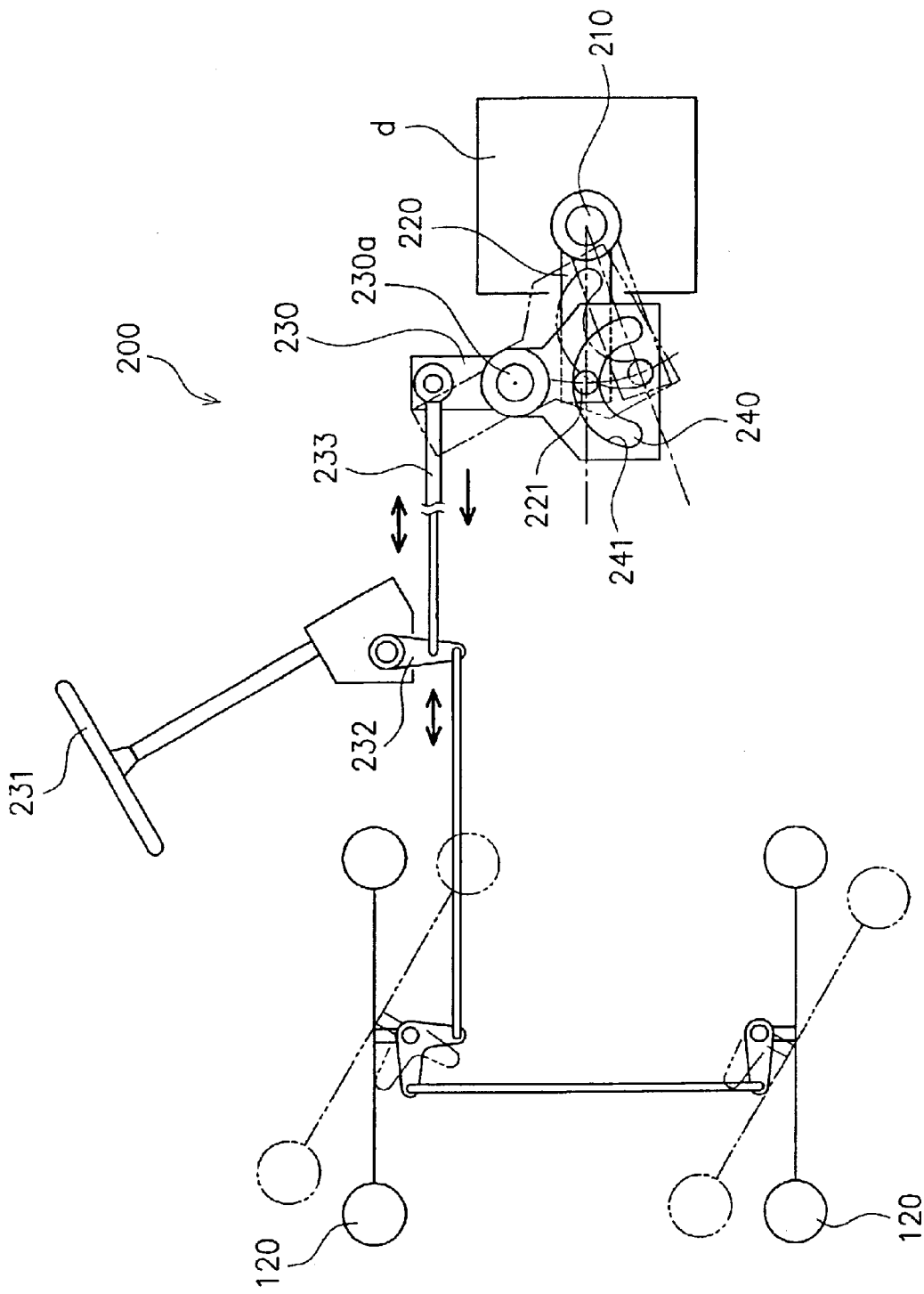
FIG. 3 is an example of an operation mechanism for operating a non-stepwise speed change unit used in the running power transmission mechanism of the present invention.

The non-stepwise-speed-change-unit operation mechanism 200 is so designed to be capable of achieving the above demand. FIG. 3 is an explanatory view of the operation of the non-stepwise-speed-change-unit operation mechanism 200 in this embodiment.

As illustrated in FIG. 3, the operation mechanism 200 includes control shaft 210 for slantingly moving the output adjusting member 53 (the movable swash plate 68 in this embodiment) of the non-stepwise speed change unit 50 according to its axial rotation, control arm 220 with a proximal end connected with the control shaft 210, and operation arm 230 that is engaged with a free end of the control arm 20 and pivots around a reference shaft according to the slanting angle or the operating angle of handle 231 or any other steering-wheel operation member.

In this embodiment, pivoting arm 232, which pivots around a pivoting shaft according to the slanting angle of the steering-wheel operation member, is coupled with a first end of the operation arm 230 with coupling shaft 233, and a second end of the operation arm 230 is engaged with the free end of the control arm 220. Whereby, the operation arm 230 is rotated around reference shaft 230*a* according to the slanting angle of the steering-wheel operation member.

More specifically, the second end of the operation arm 230 and the free end of the control arm 220 are engaged with each other via a camming mechanism. That is, the second end of the operation arm 230 forms cam groove 240 with cam surface 241, while the free end of the control arm 220 is provided with cam follower 221, which is engaged in the cam groove 240 so as to contact the cam surface 241.

The cam surface 241 is so designed to displace the pivoting angle of the free end of the control arm 220 according to the pivoting angle of the operation arm 230, and allow the free end of the control arm 220 to be pivoted with a larger angular displacement or increase its pivoting angular displacement with respect to the pivoting angle of the operation arm 230, as the pivoting angle of the operation arm 230 is enlarged.

Accordingly, when comparing a pivoting angular displacement of the free end of the control arm 220 at the time when the operation arm 230 is pivoted by a predetermined angle (e.g., 1 degree) around a reference position (solid line in FIG. 3) at which the operation arm 230 is positioned when the steering wheels 120 are oriented in a direction allowing the vehicle to travel straight (i.e., in the straight travelling state), and a pivoting angular displacement of the free end of the control arm 220 at the time when the operation arm 230 is pivoted by a predetermined angle (e.g., 1 degree) around a maximum pivoting position at which the operation arm 230 is positioned when the steering wheels 120 are oriented in a direction allowing the vehicle to turn at the maximum angle (i.e., in a maximum turning state), the latter is larger than the former.

As illustrated in FIG. 3, in this embodiment, the cam surface 241 is shaped so as to enable the free end of the control arm 220 to have a minimized distance to the reference shaft 230*a* of the operation arm 230 when the steering wheels 120 are in the straight travelling state (a solid line in FIG. 3, hereinafter refereed to a reference position), and when the steering wheels 120 are in the turning state, the free end of the control arm 220 to be moved away from the reference shaft 230*a* of the operation arm 230 as the turning angle is enlarged, and the free end of the control arm 220 to have a rate of moving away from the reference shaft 230*a* accelerated as the turning angle is enlarged.

In this embodiment, the cam surface 241 is formed into a curved shape so as to enable the control arm 220 to pivot from the reference position in one direction, regardless of the pivoting direction of the operation arm 230.

Figure 4:
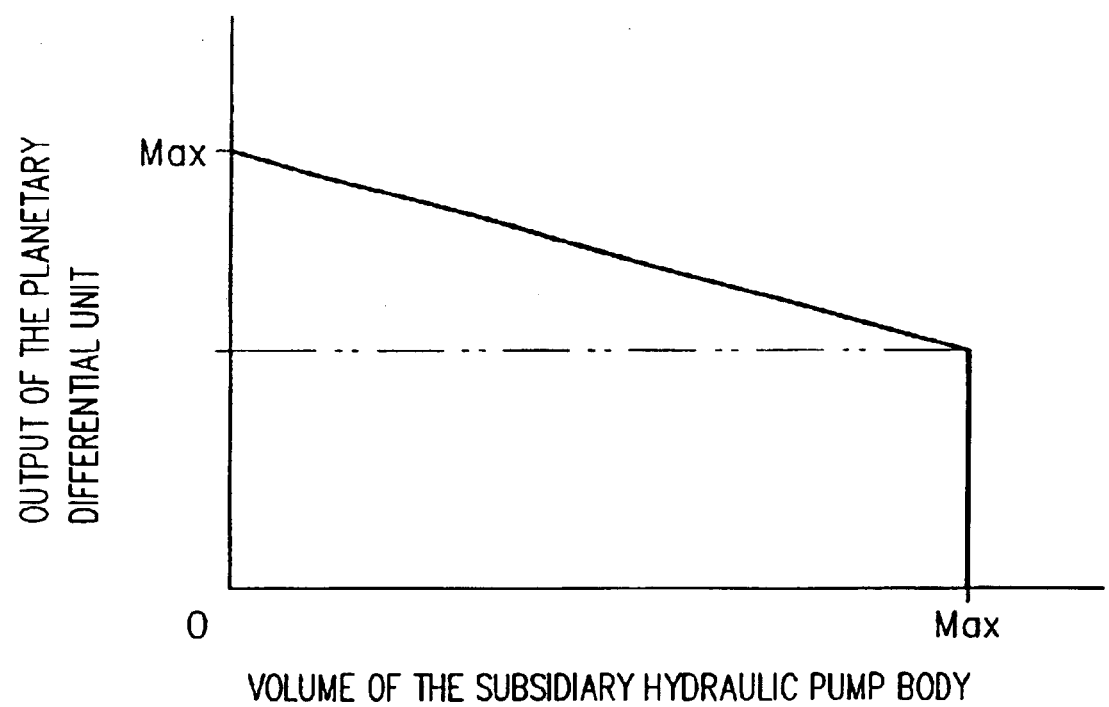
FIG. 4 is a graph showing variation in output of a third element of a planetary differential unit relative to variation in volume of a subsidiary hydraulic pump body in the running power transmission mechanism of FIG. 1.

The graph in FIG. 4 shows variation in output of the third element 73 of the planetary differential unit 70 according to variation in volume of the sub-hydraulic pump body 62 in the running power transmission mechanism 1A. In this embodiment, as illustrated in FIG. 1, the drive power of the second main-output shaft 13 is reversely inputted into the sub-pump shaft 61, and the sub-pump shaft 61 is coupled with the pinion shaft 84. The output of the sub-motor shaft 63 is reversely inputted into the first side bevel gear 81 and steering-wheel drive power is take off from the second side bevel gear 82.

With the above arrangement, at the time when the sub-HST 60 is in a neutral state, the planetary differential unit 70 is in the maximum output state. In turn, at the time when the sub-HST 60 is in the maximum output state, the planetary differential unit 70 exerts output at the same drive power speed as that of the non-steering wheels (see FIG. 4).

That is, in this embodiment, the steering-wheel speed change device 40 is drawn into a standard transmission state, which drives the steering wheels 120 substantially at the same speed as that of the non-steering wheels 110 when the sub-HST 60 is in the maximum output state, and is moved into a higher speed transmission state, which drives the steering wheels 120 at a higher speed than that of the non-steering wheels 110 when the sub-HST 60 is moved from the maximum output state to the neutral state. Also, when the sub-HST 60 is drawn into the neutral state, the steering-wheel speed change device 40 drives the steering wheels 120 at the maximum speed.

Accordingly, in this embodiment, the non-stepwise-speed-change-unit operation mechanism 200 is so designed to allow the sub-HST 60 to lie in the maximum output state during the steering wheels 120 are in the straight travelling state, and to be moved from the maximum output state to the neutral state when the steering wheels 120 have been turned, and to be drawn into the neutral state when the steering wheels 120 are turned by the maximum angle.

Also, as described above, the non-stepwise-speed-change-unit operation mechanism 200 is so designed to allow the rate of increase in rotational drive speed of the steering wheels 120 relative to the pivoting angular displacement to be accelerated, as the steering angle of the steering wheels 120 is enlarged.

The running power transmission mechanism 1A having the above arrangement produces the following desirable effects. That is, since the steering-wheel speed change device 40 is provided with the non-stepwise speed change unit 50, and the speed of output of the steering-wheel speed change device 40 can be non-stepwisely changed according to the steering angle of the steering wheels 120, there causes no speed difference between the wheels of the vehicle when it turns, hence effectively preventing damages of a running surface such as lawn.

A part of the steering-wheel drive power outputted to the steering wheels 120 from the main-transmission device 10 is led to the non-stepwise speed change unit 50, in which the speed of the part of the steering-wheel drive power is changed, and is inputted into the second element 72 of the planetary differential unit 70 as a variable input, while the residual part of the steering-wheel drive power is inputted directly into the first element 71 of the planetary differential unit 70 as a fixed input rather than inputting into the non-stepwise speed change unit 50, and drive power is outputted to the steering wheels 120 through the third element 73 of the planetary differential unit 70. That is, the arrangement where the non-stepwise speed change unit 50 is combined with the planetary differential unit 70, and only the part of the drive power from the main-transmission device 10 is inputted into the non-stepwise speed change unit 50 can achieve downsizing of the non-stepwise speed change unit 50, while effectively widening a speed change range. As a result, it is possible to achieve cost reduction and secure a free space, while obtaining a sufficient speed change range of the steering-wheel drive speed.

Moreover, the running power transmission mechanism 1A of this embodiment, which is provided with the clutch device 55 on the upstream side of the steering-wheel speed change device 40, can prevent input of unnecessary drive power to the steering-wheel speed change device 40 during the 2-wheel drive operation with only the non-steering wheels driven, and minimize drive loss in the running power transmission path from the driving source to the driving wheels.

Second Embodiment

Figure 5:
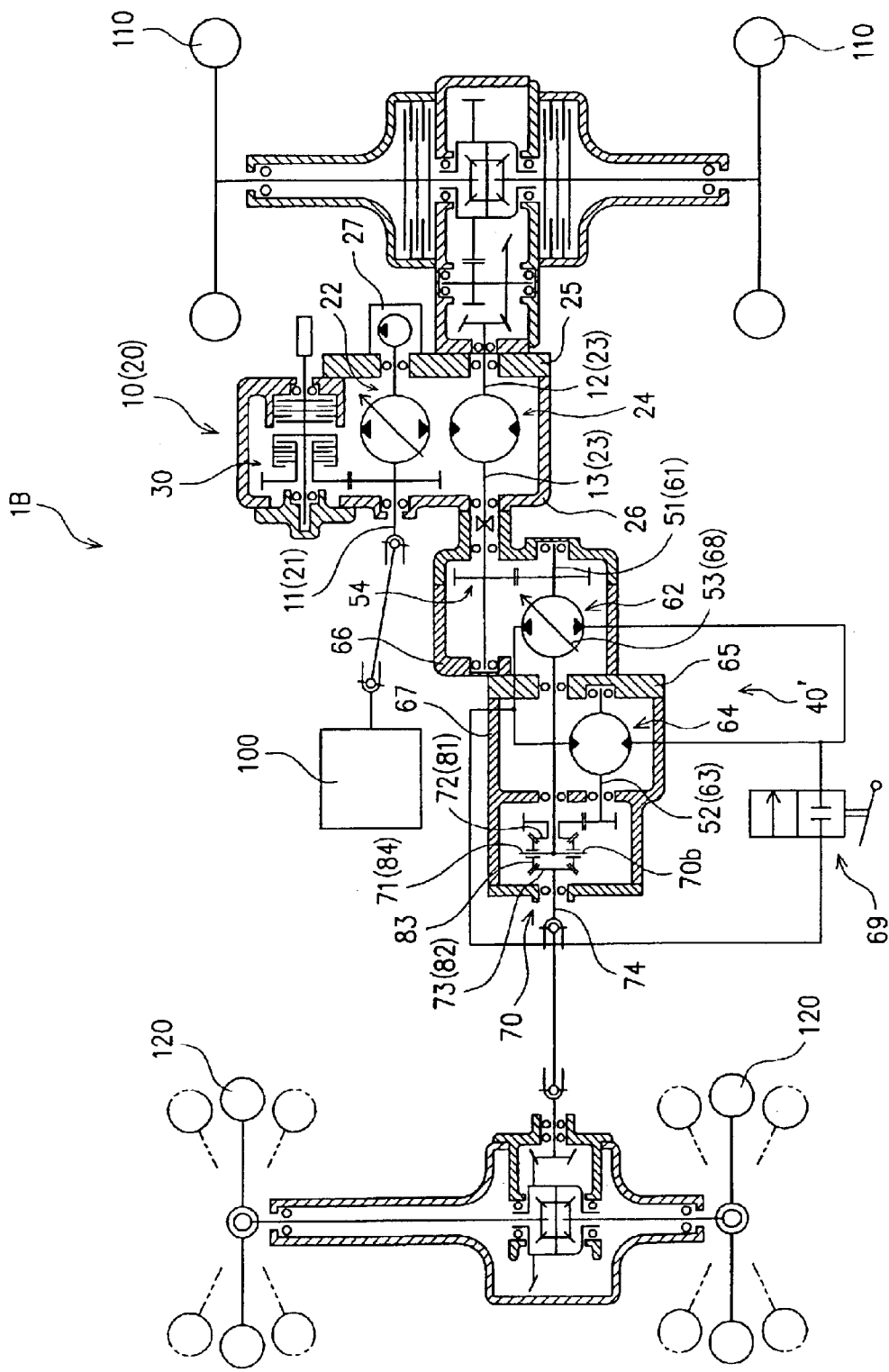
FIG. 5 is a model view illustrating a vehicle to which a second embodiment of the running power transmission mechanism according to the present invention has been applied.

The description will be made for a second embodiment of the present invention with reference to the accompanied drawings. FIG. 5 is a model view illustrating power transmission of a vehicle to which running power transmission mechanism 1B of this embodiment according to the present invention has been applied.

In the following description, corresponding or identical parts to those of the first embodiment have been given the same reference characters or those with primes (') to omit a detailed description thereof.

As illustrated in FIG. 5, the running power transmission mechanism 1B of this embodiment includes bypass valve 69 placed in a hydraulic passage providing a fluid connection between the sub-hydraulic pump body 62 and the sub-hydraulic motor body 64. This bypass valve 69 is an alternative to the clutch device 55 in the running power transmission mechanism 1A of the first embodiment.

In this running power transmission mechanism 1B, the sub-pump shaft 61 keeps rotating even in the 2-wheel drive state with only the non-steering wheels driven. As a result, the same desirable effects as those of the first embodiment can be produced except for causing some drive loss.

Third Embodiment

Figure 6:
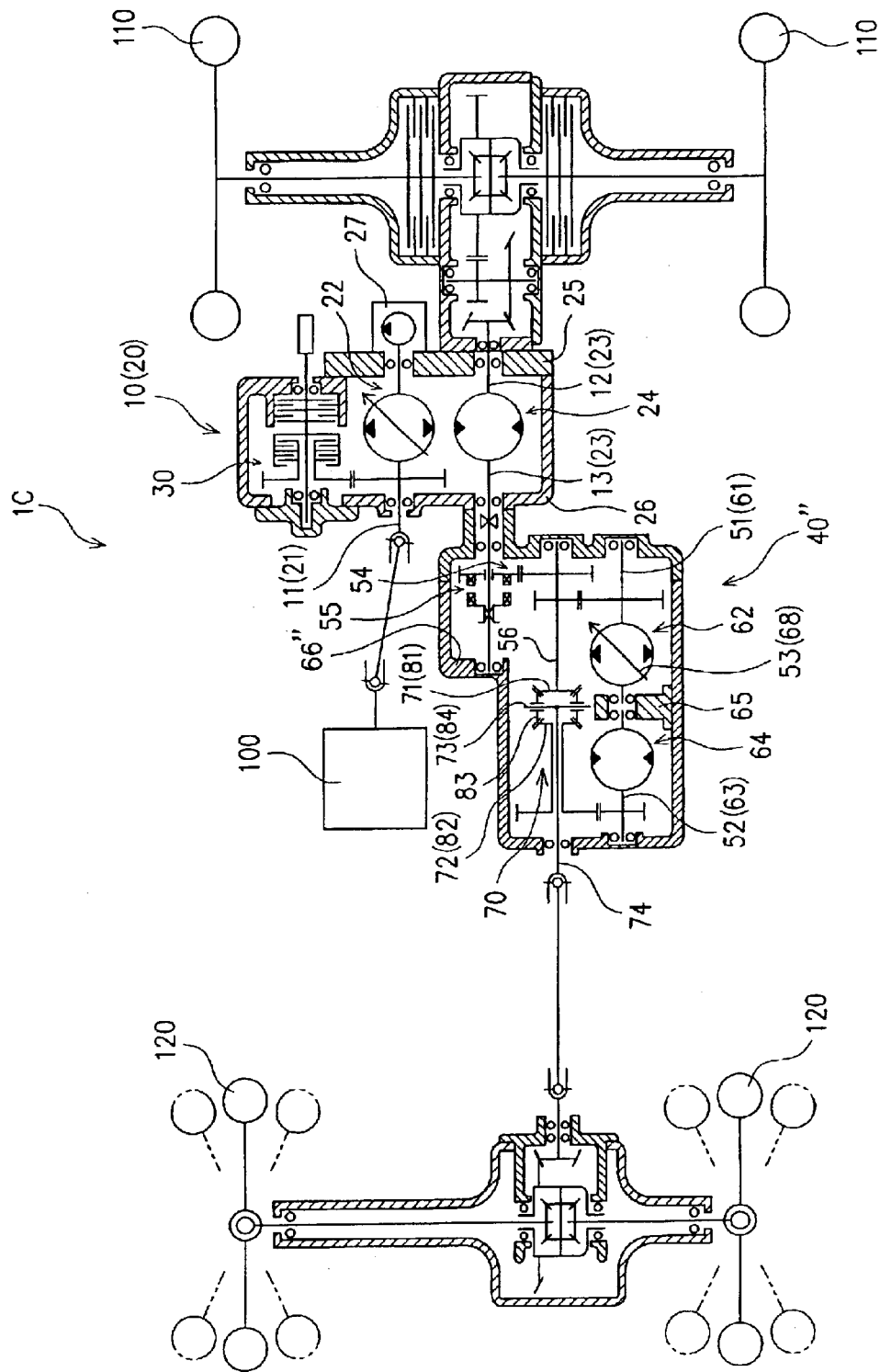
FIG. 6 is a model view illustrating a vehicle to which a third embodiment of the running power transmission mechanism according to the present invention has been applied.

The description will be made for a third embodiment of the present invention with reference to the accompanied drawings. FIG. 6 is a model view illustrating power transmission of a vehicle to which running power transmission mechanism 1C of this embodiment according to the present invention has been applied.

In the following description, corresponding or identical parts to those of the first and second embodiments have been given the same reference characters or those with primes (") to omit a detailed description thereof.

As illustrated in FIG. 6, in this running power transmission mechanism 1C of this embodiment, the planetary differential unit 70 is disposed between the sub-hydraulic pump body 62 and the sub-hydraulic motor body 64 with respect to the fore and aft direction of the vehicle, thereby shortening the length of the steering-wheel speed change device 40" in the fore and aft direction of the vehicle.

Specifically, in this embodiment, the steering-wheel speed change device 40" has intermediate shaft 56, which extends in the fore and aft direction of the vehicle and has a first end operatively connected with the second main-output shaft 13 and a second end connected with the first side bevel gear 81 of the planetary differential unit 70.

The sub-pump shaft 61 is disposed substantially coaxial with the sub-motor shaft 63 in the fore and aft direction of the vehicle with the sub-center section 65 therebetween. The sub-pump shaft 61 is operatively connected with the intermediate shaft 56 via a suitable transmission mechanism, and the sub-motor shaft 63 is connected with the second side bevel gear 82 of the planetary differential unit 70 via a suitable transmission mechanism. It is so designed that orbital motion of the pinion shaft 84 of the planetary differential unit 70 is taken off as output of the planetary differential unit 70. That is, in this embodiment, the first side bevel gear 81, the second side bevel gear 82 and the pinion shaft 84 respectively serve as the first, second and third elements 81, 82, 83.

The running power transmission mechanism having the above arrangement allows the steering-wheel speed change device 40" to have a shortened length in the fore and aft direction of the vehicle, thereby providing an improved design flexibility in designing the vehicle.

Fourth Embodiment

Figure 7:
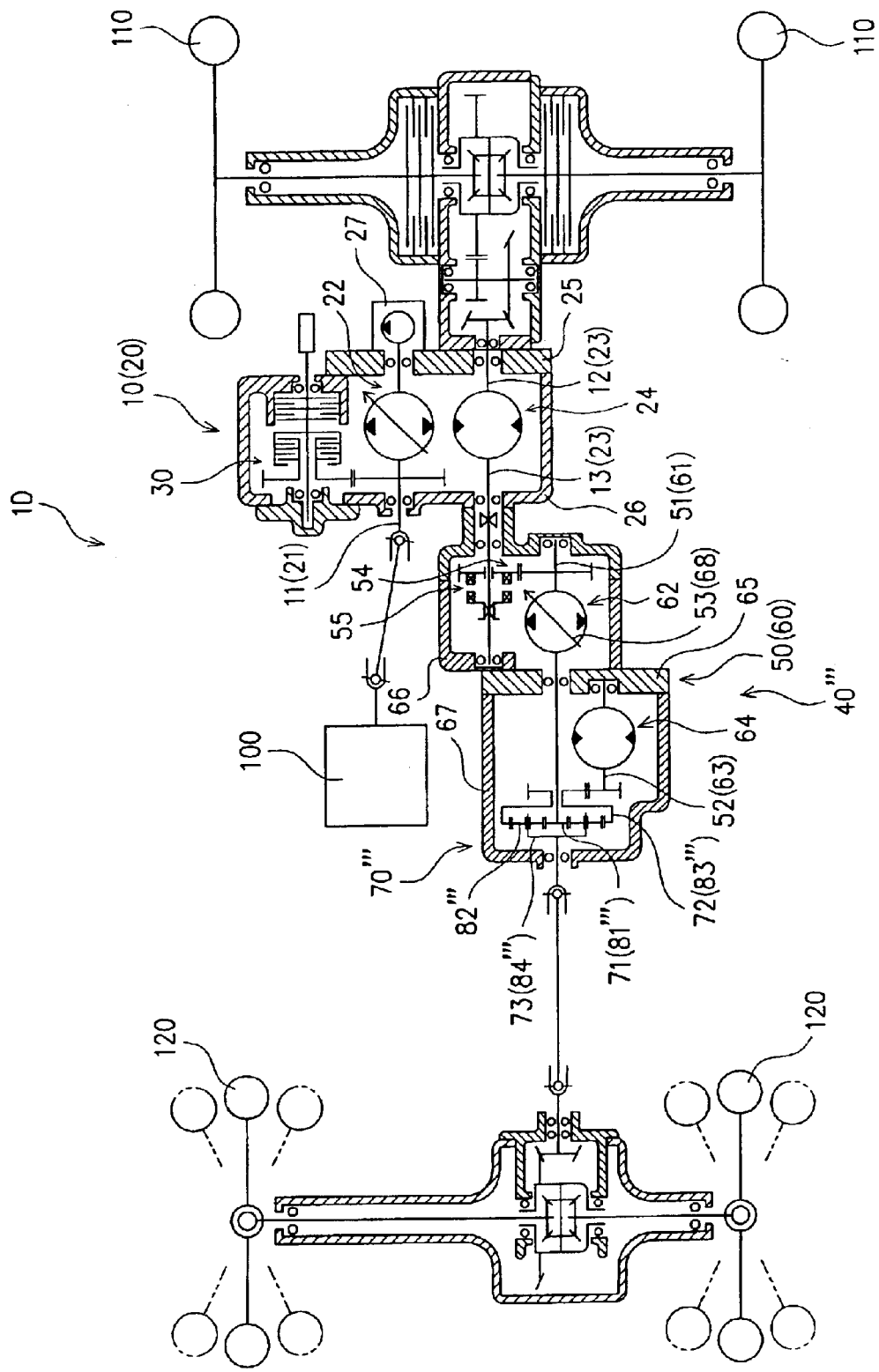
FIG. 7 is a model view illustrating a vehicle to which a fourth embodiment of the running power transmission mechanism according to the present invention has been applied.

The description will be made for a fourth embodiment of the present invention with reference to the accompanied drawings. FIG. 7 is a model view illustrating power transmission of a vehicle to which running power transmission mechanism 1D of this embodiment according to the present invention has been applied.

In the following description, corresponding or identical parts to those of the first to third embodiments have been given the same reference characters or those with primes ('") to omit a detailed description thereof In this running power transmission mechanism 1D, the planetary differential unit 70 in the running power transmission mechanism 1A of the first embodiment is replaced by planetary differential unit 70'".

The planetary differential unit 70'" includes sun gear 81'", planetary gear 82'" meshed with the sun gear 81'" to be moved around the same, outer ring member 83'" with an internal gear meshed with the planetary gear 82'", and carrier 84'" which is rotated by orbital motion of the planetary gear 82'".

The sun gear 81'" is operatively connected with the sub-pump shaft 61, and the outer ring member 83'" is operatively connected with the sub-motor shaft 63. It is so designed that steering-wheel drive power is taken off from the carrier 84'". That is, in this embodiment, the sun gear 81'", the outer ring member 83'" and the carrier 84'" respectively serve as the first to third elements 71, 72, 73.

Figure 8:
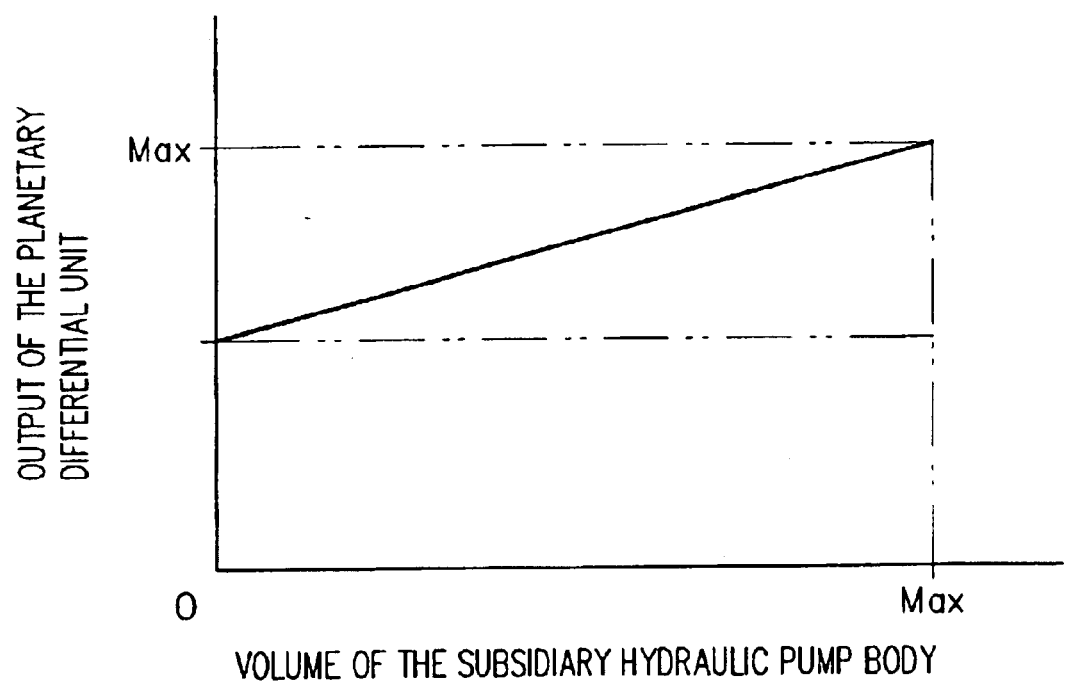
FIG. 8 is a graph showing variation in output of a third element of a planetary differential unit relative to variation in volume of a subsidiary hydraulic pump body in the running power transmission mechanism of FIG. 7.

FIG. 8 is a graph showing variation in output of the third element 73 of the planetary differential unit 70'" relative to variation in volume of the subsidiary hydraulic pump body 62 in the running power transmission mechanism 1D. As described above, in this embodiment, the drive power of the second main-output shaft 13 is reversely inputted into the sub-pump shaft 61, the sub-pump shaft 61 is connected with the sun gear 81'", and the output of the sub-motor shaft 63 is reversely inputted into the outer ring member 83'" so as to take off steering-wheel drive power from the carrier 84'".

With the above arrangement, as illustrated in FIG. 8, when the sub-HST 60 is in the neutral state, the planetary differential unit 70'" outputs power of a constant speed. When the sub-HST 60 has been brought out of the neutral state for the maximum output state, the planetary differential unit 70'" outputs power of a higher speed. When the sub-HST 60 outputs the maximum power, the planetary differential unit 70'" also outputs the maximum power.

Accordingly, in this embodiment, the non-stepwise-speed-change-unit operation mechanism 200 brings the sub-HST 60 into the neutral state when the steering wheels 120 are in the straight travelling state, brings the sub-HST 60 out of the neutral state for the maximum output state when the steering wheels 120 are turned, and bring the sub-HST 60 into the maximum output state when the steering wheels 120 are turned by the maximum angle.

Thus, in this embodiment, when the steering wheels 120 are in the straight travelling state, the sub-HST 60 is placed in the neutral state. As a result, loss in the running power transmission path can be reduced. That is, since the vehicle in general travels straight for a longer time than it turns, the operation time of the sub-HST 60 can be reduced and hence power loss in the running power transmission path can be reduced by placing the sub-HST 60 in the neutral state during the vehicle travels straight or the steering wheels are driven at a constant speed.

Various constructions can be employed to allow the planetary differential unit to output power of a constant speed when the sub-HST is in the neutral state, and output power of a higher speed when the sub-HST is in the higher speed state. That is, in the first to third embodiments, by such as varying the direction of rotation inputted into the sub-HST and the direction of rotation inputted into the planetary differential unit, it is possible to allow the planetary differential unit to output power of a constant speed when the sub-HST is in the neutral state, and output power of a higher speed when the sub-HST is in the higher speed state.

Fifth Embodiment

Figure 9:
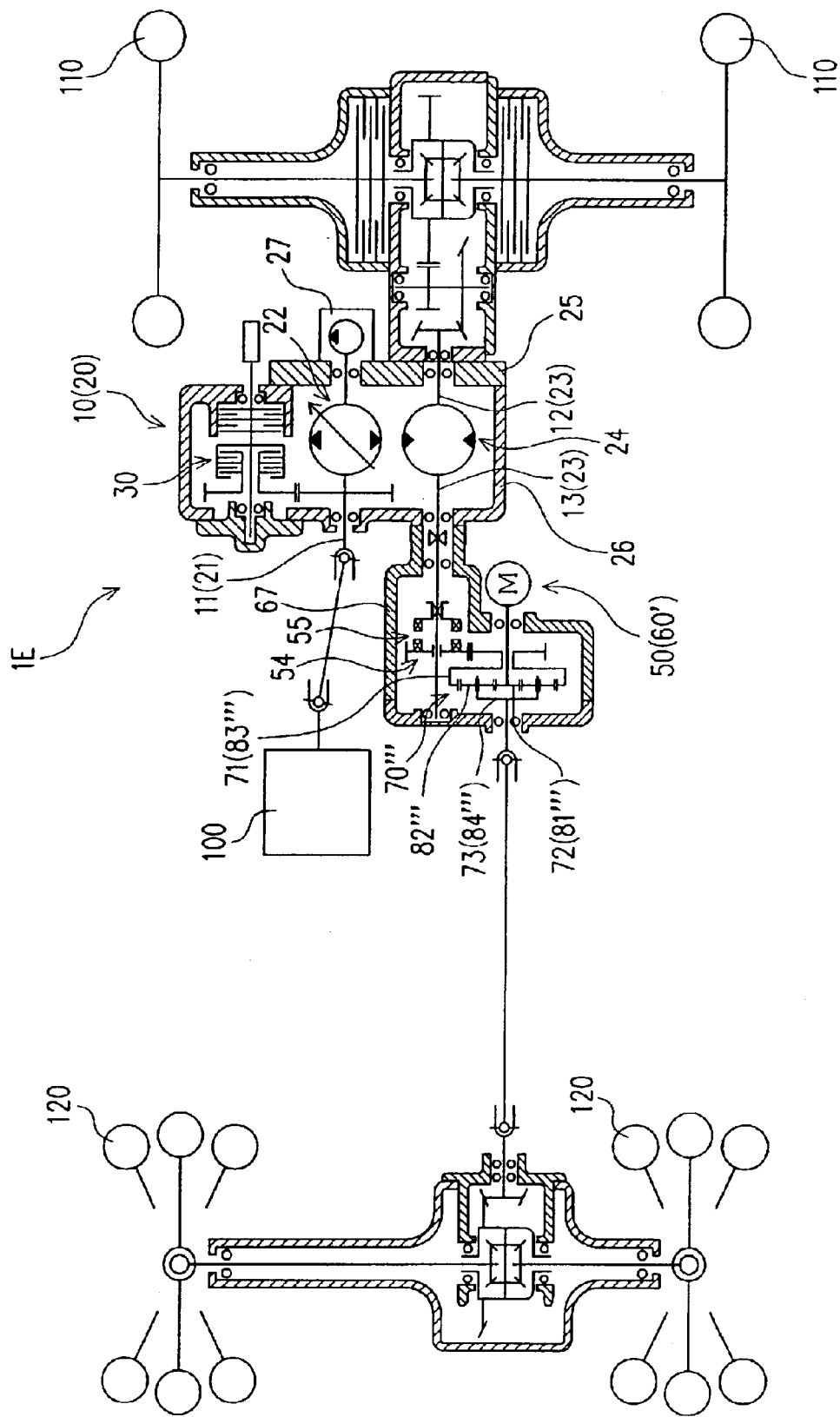
FIG. 9 is a model view illustrating a vehicle to which a fifth embodiment of the running power transmission mechanism according to the present invention has been applied.

The description will be made for a fifth embodiment of the present invention with reference to the accompanied drawings. FIG. 9 is a model view illustrating power transmission of a vehicle to which running power transmission mechanism 1E of this embodiment according to the present invention has been applied.

In the following description, corresponding or identical parts to those of the first to fourth embodiments have been given the same reference characters or those with primes to omit a detailed description thereof.

In the running power transmission mechanism 1E of this embodiment, the sub-HST 60 in the running power transmission mechanism 1D of the fourth embodiment is replaced by electric motor 60' as the non-stepwise speed change unit 50 of the steering-wheel speed change device 40, and input and output members of the planetary differential unit 70'" are suitably modified.

Specifically, in this embodiment, drive power from the second main-output shaft 13 is inputted into the outer ring member 83'", the output shaft 52 of the electric motor 60' is connected with the sun gear 81'", and output with its speed changed, which is for the steering wheels, is taken off from the carrier 84'". In this embodiment, the outer ring member 83'", the sun gear 81'", and the carrier 84'" respectively serve as the first to third elements 71, 72, 73.

In this embodiment, an output shaft of the electric motor 60' is inputted into the sun gear 81'" so as to reduce load torque applied to the electric motor. That is, it is so designed that load torque to the electric motor 60' can be reduced by rotating the output shaft of the electric motor 60' at high speed. In this embodiment, the same desirable effects as in the fourth embodiment can be produced.

In the above respective embodiments, the non-stepwise-speed-change-unit operation mechanism 200 as employed is of a mechanical type. However, a varying type of the non-stepwise-speed-change-unit operation mechanism can be employed, provided that it can vary the speed of the output of the steering-wheel speed change device 40 according to the steering angle of the steering wheels. For example, it is possible to employ a steering-angle detection means for detecting the steering angle of the steering wheels or steering angle of the steering-wheel operation member, controller for outputting control signals based upon signals from the steering-angle detection means, and a hydraulic mechanism for operating the output adjusting member based upon the control signals.

Sixth Embodiment

Figure 10:
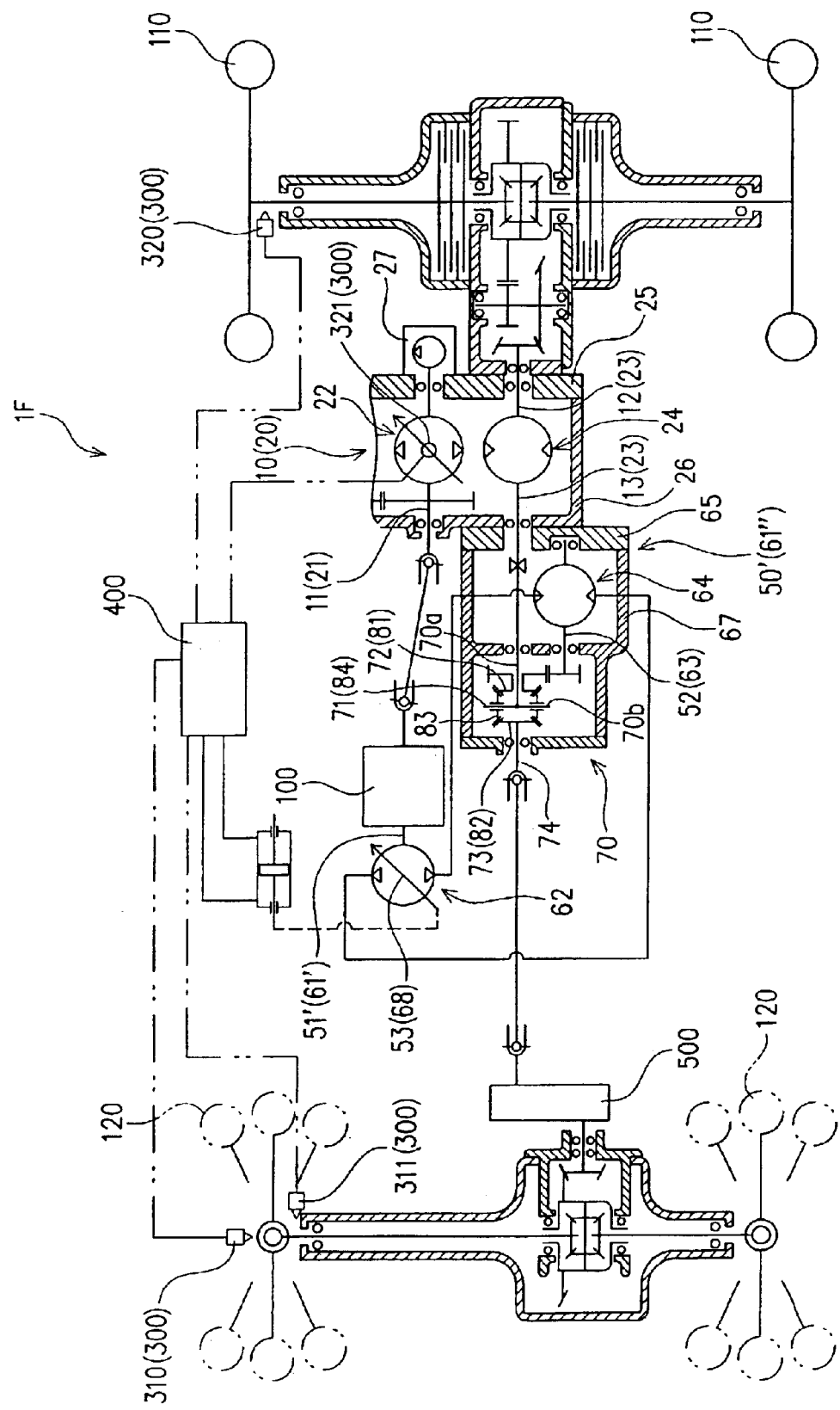
FIG. 10 is a model view illustrating a vehicle to which a sixth embodiment of the running power transmission mechanism according to the present invention has been applied.

The description will be made for a sixth embodiment of the present invention with reference to the accompanied drawings. FIG. 10 is a model view illustrating power transmission of a vehicle to which running power transmission mechanism 1F of this embodiment according to the present invention has been applied.

In the following description, corresponding or identical parts to those of the first to fifth embodiments have been given the same reference characters or those with primes to omit a detailed description thereof.

In the running power transmission mechanism 1F of this embodiment, a method of inputting power into the sub-hydraulic pump body 62 in the sub-HST 60 is differentiated from that in the running power transmission mechanism 1A of the first embodiment. That is, in the first embodiment, as described above, a part of the steering-wheel drive power outputted from the main-transmission device 10 to the steering wheels 120 is inputted into the sub-hydraulic pump body 62. On the contrary, the running power transmission mechanism 1F of this embodiment inputs power from the driving source directly to the sub-hydraulic pump body 62 as its drive power.

Specifically, the running power transmission mechanism 1F of this embodiment includes non-stepwise speed change unit 50″ constituted by the sub-HST 60″, instead of the non-stepwise speed change unit 50 constituted by the sub-HST 60. The sub-HST 60″ has sub-pump shaft 61′ coupled with the driving source.

Thus, in this embodiment, the sub-pump shaft 61′, which is coupled with the driving source and is constantly driven at a rotation frequency of a constant ratio relative to the driving source, constitutes input shaft 51′ of the non-stepwise speed change unit 50″. Whereby, pumping performance of the sub-pump body 62 can be improved and steering posture from the low-speed to high-speed travelling can be stabilized.

That is, in the first embodiment, a part of drive power from the main-motor shaft 23 is inputted into the sub-hydraulic pump body 62 (see FIG. 1). In this arrangement, the input of drive power into the sub-hydraulic pump body 62 is varied according to the output state of the main-HST 20 (i.e., the rotational speed of the non-steering wheels). On the contrary, in this embodiment, a constant rotation from the driving source 100 is inputted into the sub-hydraulic pump body 62. Therefore, a behavior of the sub-hydraulic pump body 62 can be stabilized. Hence, the performance of the sub-hydraulic pump body 62 can be improved.

Meanwhile, while the running power transmission mechanism 1F produces the desirable effects as mentioned above, the output rotation of the main-HST 20 inputted into the planetary differential unit 70 is not necessarily synchronized with the output rotation of the driving source 100 inputted into the sub-HST 60″. That is, in this embodiment, the output rotation of the sub-hydraulic motor body 64, which is inputted as a variable input into the second element 72 of the planetary differential unit 70, is not synchronized with the output rotation of the main-hydraulic motor body 24, which is inputted into the first element 71 of the planetary differential unit 70 as a fixed input.

For example, given that the angular displacement of the movable swash plate 68 is fixed at a predetermined amount, that is, the steering angle of the steering wheels 120 is fixed at a predetermined angle, the speed increasing ratio at the planetary differential unit 70 is varied according to the variation of the output rotation number of the main-HST 20 although the angular displacement of the movable swash plate 68 is fixed at a predetermined amount, since the ratio of the input rotation of the sub-HST 60″ relative to the output of the main-HST 20 is varied, when comparing the output rotation of the main-HST 20 at low speed and high speed.

In light of the above fact, the running power transmission mechanism 1F includes non-stepwise-speed-change-unit operation mechanism 200″ instead of the non-stepwise-speed-change-unit operation mechanism 200.

The non-stepwise-speed-change-unit operation mechanism 200″ includes signal detection unit 300 and control unit 400. The signal detection unit 300 is designed to be capable of detecting the steering angle and rotational speed of the steering wheels 120, and the rotational speed and rotational direction of the non-steering wheels 110. In this embodiment, the signal detection unit 300 includes steering-angle-detection sensor 310 for detecting the steering angle of the steering wheels 120, steering-wheel-speed sensor 311 for detecting the rotational speed of the steering wheels 120, non-steering-wheel-speed sensor 320 for detecting the rotational speed of the steered non-steering wheels 110, and direction sensor 321 for detecting the rotational direction of the non-steering wheels 110.

The control unit 400 has a processing part with a CPU and a memory part with a ROM and a RAM. The memory part stores data representative of the peripheral speed ratios of the steering wheels 120 and the non-steering wheels 110 relative to the steering angle of the steering wheels 120 (see FIG. 11).

Figure 11:
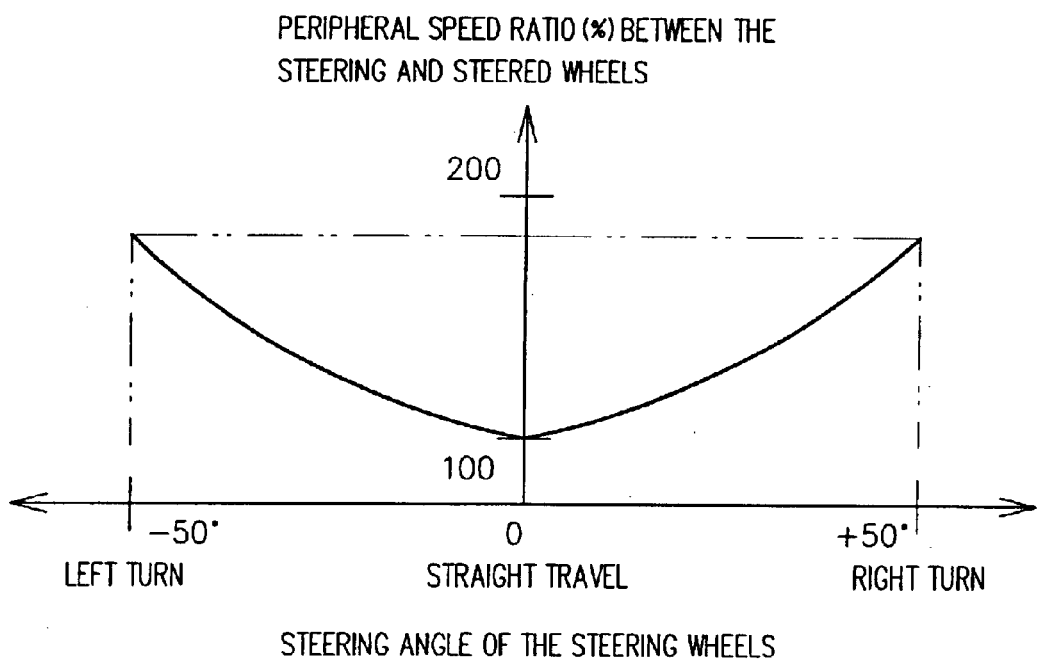
FIG. 11 is a graph showing the relationship between the steering angle of the steering wheels and the peripheral speed ratio of the steering and non-steering wheels.

The processing part is designed to be capable of controlling the output adjusting member 53 (the movable swash plate 68) based upon signals from the signal detection unit 300 so as to enable the steering angle of the steering wheels and the peripheral speed ratio between the steering and non-steering wheels to have a relationship as shown in FIG. 11.

Specifically, the processing part calculates a desirable peripheral speed ratio of the steering and non-steering wheels based upon the detected result obtained from the steering-angle-detection sensor 310, and then controls the output adjusting member 53 (the movable swash plate 68) based upon the steering-wheel speed sensor 311 and the non-steering-wheel-speed sensor 320 so as to obtain the desirable peripheral speed ratio.

For example, when comparing the output of the main-HST 20 between low speed operation and high speed operation with the steering wheels 120 displaced by X degrees, the output adjusting member 53 (the movable swash plate 68) is so controlled to have a small angular displacement when the output of the main-HST20 is in the low speed operation rather than in the high speed operation. As a result, the peripheral speed ratio of the steering wheels 120 and the non-steering wheels 110 is kept constant. Reference numeral 500 in FIG. 10 represents a speed reduction gear device for synchronized rotation of the steering wheels 120 and the non-steering wheels 110 when the steering wheels 120 are in the straight travelling state. The speed reduction gear device 500 is designed to have substantially the same speed reducing ratio as the speed increasing ratio of the planetary differential unit 70 when the steering wheels 120 are in the straight travelling state (or the sub-HST 60″ is in the neutral state in this embodiment). It is a matter of course that controlling of the output adjusting member 53 (the movable swash plate 68) by the control unit 400 is performed in consideration of the speed reducing ratio of the speed reduction gear device 500.

This specification is by no means intended to restrict the present invention to the preferred embodiments set forth therein. Various modifications to the running power transmission mechanism for the vehicle as described herein, may be made by those skilled in the art without departing from the spirit and scope of the present invention as defined in the appended claims.

What is claimed is:

1. A running power transmission mechanism for a vehicle for transmitting drive power from a driving source to steering and non-steerinng wheels, which are respectively disposed closer to first and second sides of the vehicle in a fore and aft direction thereof, comprising:

a main-transmission device having a steering-wheel drive output shaft for outputting to the steering wheels drive power, which is synchronized with drive power outputted to the non-steering wheels;

steering-wheel speed change device for non-stepwisely changing the speed of drive power inputted via the steering-wheel drive output shaft and outputting the drive power to the steering wheels, in which said steering-wheel speed change device is switchable between a standard transmission state, which outputs power enabling the steering wheels to have an average peripheral speed substantially equal to an average peripheral speed of the non-steering wheels, and a higher speed transmission state, which outputs power enabling the steering wheels to have an average peripheral speed higher than an average peripheral speed of the non-steering wheels;

said steering-wheel speed change device including:
non-stepwise speed change unit having an output shaft and an output adjusting member so as to output through said output shaft power with its speed non-stepwisely changed based upon an operational state of the output adjusting member, which is operated according to a steering angle of the steering wheels; and a planetary differential unit having first, second and third elements, the first and second elements designed to respectively receive power from the steering-wheel drive output shaft and power from the output shaft of the non-stepwise speed change unit, and the third element designed to output power therefrom to the steering wheels.

2. A running power transmission mechanism according to claim 1, wherein said non-stepwise speed change unit further includes an input shaft for receiving a part of power from the steering-wheel drive output shaft, and said first element of the planetary differential unit is designed to receive the residual part of the power from the steering-wheel drive output shaft.

3. A running power transmission mechanism according to claim 2, wherein a transmission device is further provided to couple the steering-wheel drive output shaft with the input shaft of the non-stepwise speed change unit, and said transmission device has a clutch member, which is engaged and disengaged to selectively transmit power to said input shaft.

4. A running power transmission mechanism according to claim 2, wherein said non-stepwise speed change unit is an HST, which includes a hydraulic pump body driven by said input shaft, and a hydraulic motor body that is fluidly connected with said hydraulic pump body so as to output through said output shaft power with its speed non-stepwisely changed in cooperation with said hydraulic pump body, and said HST includes a bypass valve in a hydraulic passage for fluid connection between said hydraulic pump body and said hydraulic motor body.

5. A running power transmission mechanism according to claim 1, wherein said output adjusting member is operated so that an average peripheral speed of the steering wheels is increased and a rate of increase in said average peripheral speed of the steering wheels relative to a displacement of the steering angle of the steering wheels is accelerated, as the steering angle of the steering wheels is enlarged.

6. A running power transmission mechanism according to claim 1, wherein said main-transmission device is an HST, which includes a main-input shaft operatively connected with the driving source, a hydraulic pump body driven by said main-input shaft, and a hydraulic motor body that is fluidly connected with said hydraulic pump body so as to output through said steering-wheel drive output shaft power with its speed non-stepwisely changed in cooperation with said hydraulic pump body.

7. A running power transmission mechanism according to claim 1, wherein said steering-wheel speed change device is detachably attached to said main-transmission device.

8. A running powertransmission mechanism according to claim 1, wherein said non-stepwise speed change unit further includes an input shaft for receiving constant power from said driving source, and said output adjusting member is controlled based upon the steering angle and the average peripheral speed of the steering wheels, and the rotational direction and the average peripheral speed of the non-steering wheels so that the steering wheels and the non-steering wheels are rotated in synchronization with each other when the steering wheels are in a straight travelling state, and the speed of the steering wheels is increased as the steering angle of the steering wheels is enlarged when the steering wheels are in a turning state.

* * * * *